US011144259B2

(12) United States Patent
Mochizuki

(10) Patent No.: US 11,144,259 B2
(45) Date of Patent: Oct. 12, 2021

(54) INFORMATION PROCESSING SYSTEM THAT EXECUTES PROCESSES DESCRIBED IN AN ADAPTER CORRESPONDING TO AN AUTHENTICATED USER, AND METHOD OF CONTROLLING IT

(71) Applicant: CANON KABUSHIKI KAISHA, Tokyo (JP)

(72) Inventor: Hirofumi Mochizuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 16/520,634

(22) Filed: Jul. 24, 2019

(65) Prior Publication Data
US 2020/0042261 A1 Feb. 6, 2020

(30) Foreign Application Priority Data
Jul. 31, 2018 (JP) .............................. JP2018-144022

(51) Int. Cl.
*G06F 3/12* (2006.01)
*H04N 1/44* (2006.01)

(52) U.S. Cl.
CPC .......... *G06F 3/1222* (2013.01); *G06F 3/1238* (2013.01); *H04N 1/4413* (2013.01); *H04N 1/4426* (2013.01); *G06F 3/1288* (2013.01)

(58) Field of Classification Search
None
See application file for complete search history.

(56) References Cited

U.S. PATENT DOCUMENTS

| 2014/0078538 | A1* | 3/2014 | Morikawa | G06F 3/1293 358/1.13 |
| 2015/0271348 | A1* | 9/2015 | Kimura | G06F 3/12 358/474 |
| 2017/0075633 | A1* | 3/2017 | Sawamura | H04N 1/00514 |
| 2018/0107956 | A1* | 4/2018 | Yamada | H04L 63/10 |
| 2018/0150264 | A1* | 5/2018 | Oguma | H04N 1/00127 |

FOREIGN PATENT DOCUMENTS

JP 2010140243 A 6/2010

* cited by examiner

*Primary Examiner* — Mohammad H Ghayour
*Assistant Examiner* — Pawan Dhingra
(74) *Attorney, Agent, or Firm* — Venable LLP

(57) ABSTRACT

An information processing system in which at least a server and an information processing apparatus and an image forming apparatus are connected via a network is provided. The server authenticates a user in response to a request for authentication from the image forming apparatus or the information processing apparatus, and stores an adapter registered in the information processing apparatus. The image forming apparatus obtains an adapter registered in the server and corresponding to the authenticated user and executes a process to be executed when the process is described in the obtained adapter and transmits, to the server, a result of the process. The server executes a process to be executed by the server when the process to be executed by the server is described in the obtained adapter and registers the result of the executed process.

7 Claims, 11 Drawing Sheets

F I G. 10A

ESTIMATION SHEET  STATE: ALREADY SENT

ESTIMATION NUMBER: ABC0001

BUSINESS PARTNER: ○○ INC.

PERSON IN CHARGE: TARO YAMADA

ORDER CONTENT ×× 4 DEVICES

TOTAL ¥100,000

ORDER NUMBER: ---

[PRINT]

F I G. 10B

ESTIMATION SHEET  STATE: CLOSE

ESTIMATION NUMBER: ABC0001

BUSINESS PARTNER: ○○ INC.

PERSON IN CHARGE: TARO YAMADA

ORDER CONTENT ×× 4 DEVICES

TOTAL ¥100,000

ORDER NUMBER: DEF0001

[PRINT]

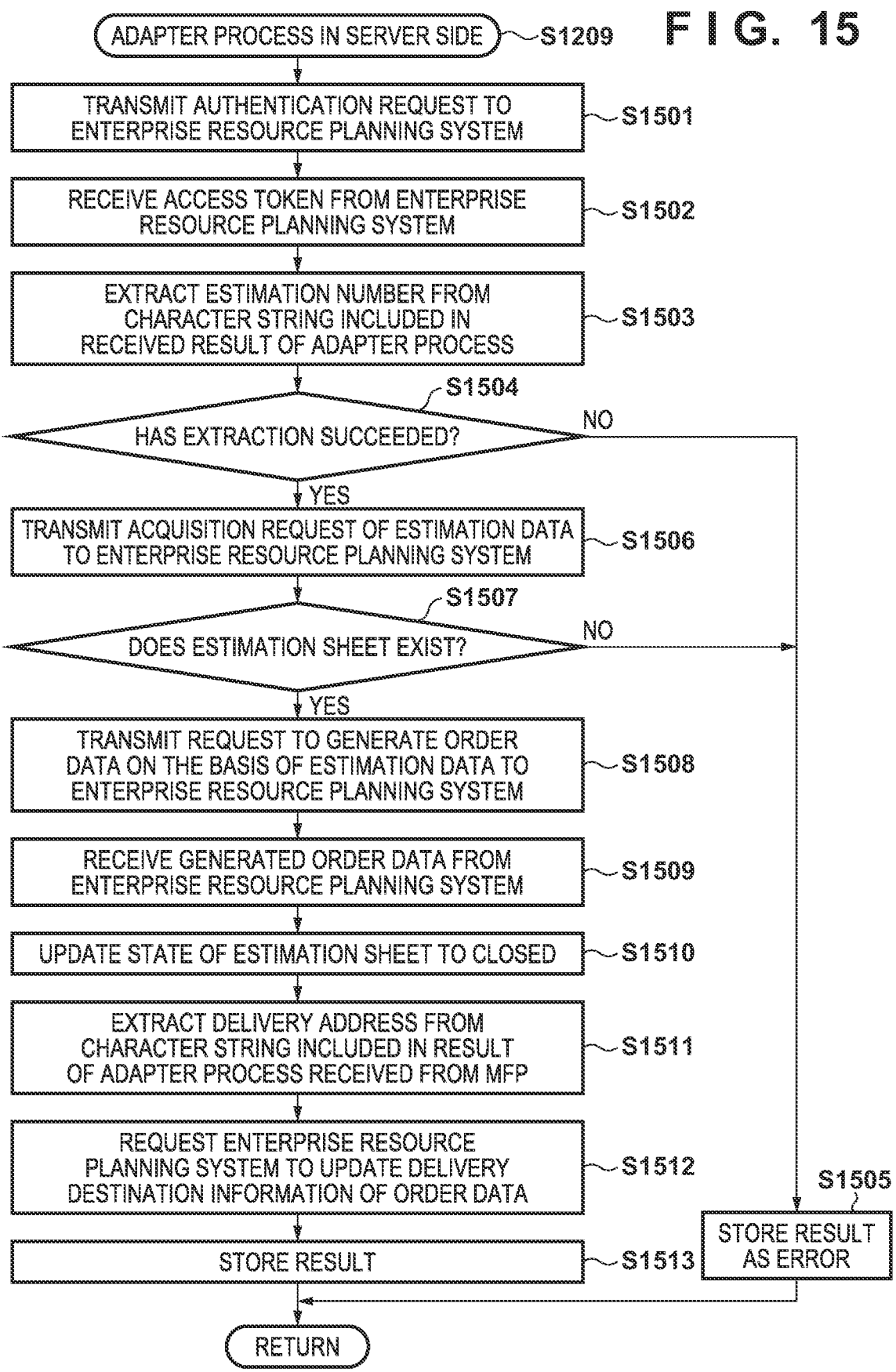

INFORMATION PROCESSING SYSTEM THAT EXECUTES PROCESSES DESCRIBED IN AN ADAPTER CORRESPONDING TO AN AUTHENTICATED USER, AND METHOD OF CONTROLLING IT

BACKGROUND OF THE INVENTION

Field of the Invention

The present invention relates to an information processing system, a server, an image forming apparatus, and methods of respectively controlling the information processing system, the server and the image forming apparatus.

Description of the Related Art

For efficient corporate activities, services such as a customer relationship management (CRM) system and an enterprise resource planning (ERP) system are widely available. The enterprise resource planning system is a system for performing a unified operation of tasks required for company managements including finance, accounting, sales, physical distribution warehouse and personnel, and the system improves the efficiency of business by unitarily managing a variety of information of enterprises, workflow and the like.

Generally, to register data in CRM and ERP systems, a user manually inputs the data with a PC. Often, such data input is still based on paper, and the user inputs the data into the CRM and ERP systems while viewing the paper. For example, when a user inputs data of a business partner and the person in charge into a CRM system, information such as the name of the business partner, the name of the person in charge, the email address, and the phone number is manually input while the user is viewing a business card given by the business partner.

Mistakes due to such manual input may cause a huge loss, such as delivery failure of a bill. For the purpose of reducing such problems as much as possible, Japanese Patent Laid-Open No. 2010-140243, for example, discloses reading paper documents with an image reader and registering information to a server, for example, based on the read information. In this manner, the data can be registered while reducing the error of manual input by the user.

However, various services are offered as CRM and ERP services by each vendor, and users use respective different services. Further, multiple services may be used in combination. The above-mentioned prior art is intended to automate the registration for a specific CRM system or ERP system, and as such considerable cost and time are required for building an automatic registration system tailored to a system subject to registration of each user environment.

SUMMARY OF THE INVENTION

An aspect of the present invention is to eliminate the above-mentioned problem with conventional technology.

A feature of the present invention is to provide a technique capable of registering and executing a workflow of predetermined processes tailored to the user.

According to a first aspect of the present invention, there is provided an information processing system in which at least a server and an information processing apparatus and an image forming apparatus are connected via a network, wherein the information processing apparatus comprises: a first memory device that stores a program; and at least one first processor that executes the program stored in the first memory device to cause the information processing apparatus to function as: a first requesting unit that requests authentication of a user to the server; and a first registration unit that registers, in the server, an adapter that describes a workflow of a predetermined process in response to an operation by the user successfully authenticated by the server; wherein the image forming apparatus comprises: a second memory device that stores a program; and at least one second processor that executes the program stored in the second memory device to cause the image forming apparatus to function as: a second requesting unit that requests authentication of a user to the server; an obtaining unit that obtains an adapter registered in the server and corresponding to the user authenticated by the server; a first execution unit that executes a process to be executed by the image forming apparatus when the process to be executed by the image forming apparatus is described in the adapter obtained by the obtaining unit; and a transmission unit that transmits, to the server, a result of the process executed by the first execution unit and the obtained adapter; and wherein the server comprises: a third memory device that stores a program; and at least one third processor that executes the program stored in the third memory device to cause the image forming apparatus to function as: an authentication unit that authenticates the user in response to a request for authentication from the image forming apparatus or the information processing apparatus; a storage unit that stores the adapter registered by the first registration unit; a reception unit that receives the result of the processing based on the adapter obtained by the obtaining unit from the image forming apparatus; a second execution unit that executes a process to be executed by the server when the process to be executed by the server is described in the obtained adapter from the image forming apparatus; and a second registration unit that registers the result of the process transmitted by the transmission unit and a result of the process executed by the second execution unit.

According to a second aspect of the present invention, there is provided a server for connecting at least an information processing apparatus and an image forming apparatus via a network, the server comprising: a memory device that stores a program; and at least one processor that executes the program stored in the memory device to cause the image forming apparatus to function as: an authentication unit that authenticates a user in response to an authentication request from the image forming apparatus or the information processing apparatus; a storage unit that stores an adapter registered via the information processing apparatus and describing a workflow of a predetermined process; a transmission unit that transmits, to the image forming apparatus, an adapter corresponding to the user authenticated by the authentication unit among adapters stored in the storage unit; a reception unit that receives a result of a process that is executed in the image forming apparatus on a basis of the adapter transmitted by the transmission unit; an execution unit that executes a process to be executed by the server when the process to be executed by the server is described in the adapter corresponding to the authenticated user; and a registration unit that registers the result of the process received by the reception unit and a result of the process executed by the execution unit.

According to a third aspect of the present invention, there is provided an image forming apparatus connected with a server via a network, the image forming apparatus comprising: a memory device that stores a program; and at least one processor that executes the program stored in the memory device to cause the image forming apparatus to function as: an authentication unit that authenticates a user; an obtaining unit that obtains, from the server, an adapter that describes a workflow of a predetermined process corresponding to the user authenticated; an execution unit that executes the adapter when the user provides an instruction to execute the adapter; and a notification unit that notifies the server of a result of execution by the execution unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10A is a diagram illustrating an example of estimation data input to the enterprise resource planning system according to the embodiment.

FIG. 10B is a diagram illustrating an example of estimation data input to the enterprise resource planning system according to the embodiment.

FIG. 15 is a flowchart for describing a flow of an adapter process at step S1209 of FIG. 12, which is executed by the server according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
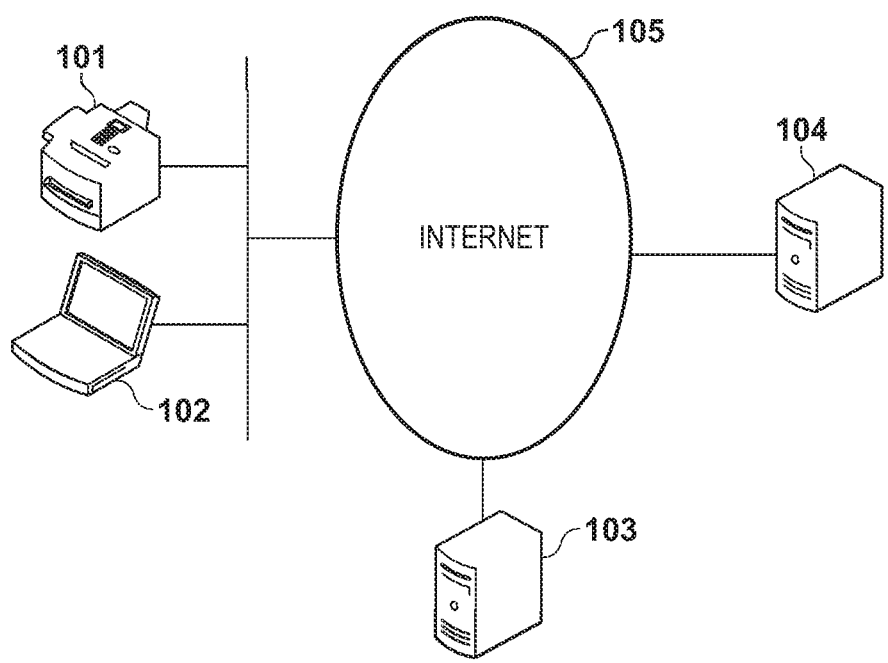
FIG. 1 is a diagram illustrating an example of a configuration of an information processing system according to an embodiment of the present invention.

FIG. 1 is a diagram for describing an example of a configuration of an information processing system according to the embodiment of the present invention.

An image forming apparatus 101, which is disposed in a user environment, is operated by a user and can access to an Internet 105. The image forming apparatus 101 includes a Web browser and can display a browser screen on the basis of screen information obtained by accessing a server 103. The image forming apparatus 101 includes an interface for externally using a printer 220 and a scanner 221 (both illustrated in FIG. 2) of the image forming apparatus 101, and the user can operate the printer 220 and the scanner 221 through communication with the server 103.

A PC (personal computer) 102, which is disposed in the user environment, is operated by the user and can access to the Internet 105. The PC 102 is used for registering an adapter in the server 103, displaying an enterprise resource planning system 104, and inputting various types of information. As described in detail later, the adapter is a registered logic that defines a workflow of a prescribed process.

The server 103 is disposed on the user environment or the Internet 105 and is accessed by the image forming apparatus 101 and the PC 102. In addition, the enterprise resource planning system 104 can be accessed via a Web API (web application programming interface) to obtain, register and update information retained in the enterprise resource planning system 104.

The enterprise resource planning system 104 is located on the user environment or the Internet 105 and is accessed by the PC 102 and the server 103. The enterprise resource planning system 104 provides a Web API for reading and registering information retained in the enterprise resource planning system 104.

Figure 2:
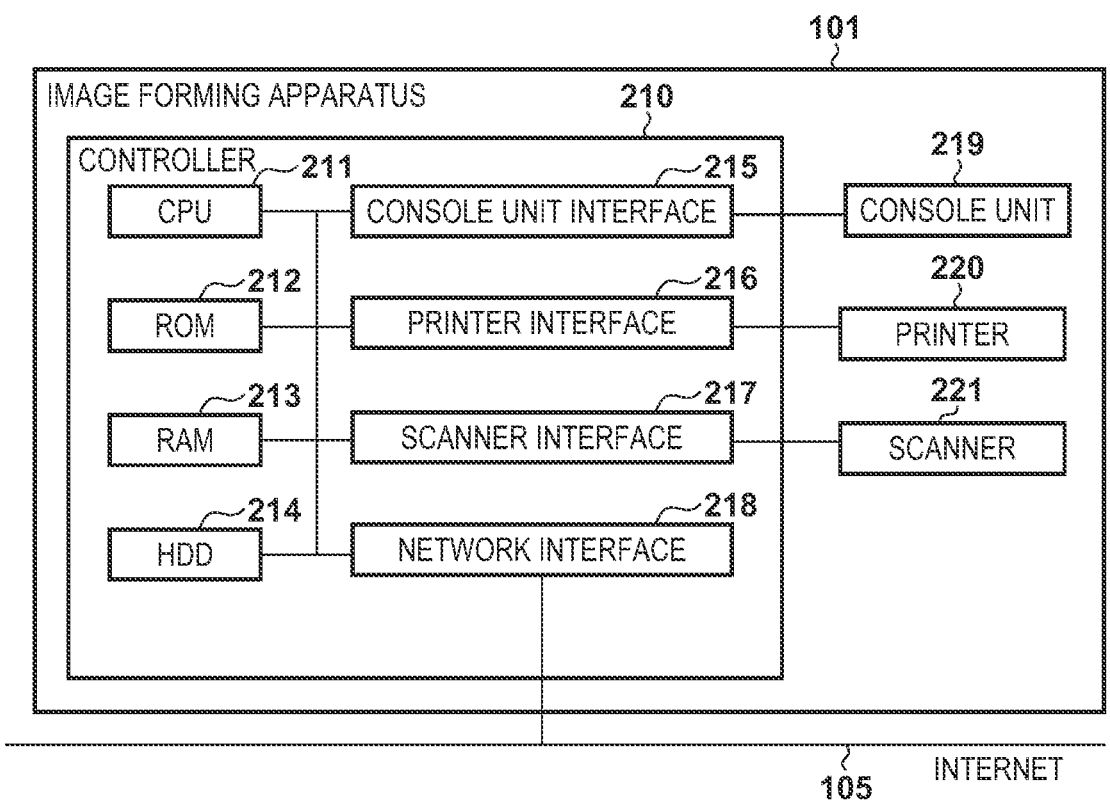
FIG. 2 is a block diagram for describing a hardware configuration of an image forming apparatus according to the embodiment.

FIG. 2 is a block diagram for describing a hardware configuration of the image forming apparatus 101 according to the embodiment.

A controller 210 including a CPU 211 controls the operation of the entirety of the image forming apparatus 101. The CPU 211 executes a boot program stored in a ROM 212, deploys an OS and a program stored in an HDD 214 in a RAM 213, and performs various controls such as read control and transmission control by executing the deployed program. The RAM 213 is used as a temporary storage area such as a work area and a main memory of the CPU 211. While in the image forming apparatus 101 according to the embodiment, one CPU 211 executes processes illustrated in the flowchart described later using one memory (the RAM 213), other aspects may be adopted. For example, a plurality of CPUs and a plurality of RAMs or HDDs may be operated in conjunction with each other to perform processes illustrated in the flowchart described later. The HDD 214 stores image data and/or various programs.

A console unit interface 215 connects a console unit 219 and the controller 210. The console unit 219 includes a display unit having a touch panel function, a keyboard, and the like. A printer interface 216 connects the printer 220 and the controller 210. Image data to be printed by the printer 220 is transferred from the controller 210 to the printer 220 via the printer interface 216 and is printed on a recording medium (sheet) in the printer 220. A scanner interface 217 connects the scanner 221 and the controller 210. The scanner 221 reads an image of the original document to generate image data (image file), and supplies the data to the controller 210 via the scanner interface 217. The image forming apparatus 101 can transmit a file or an email of the image data (image file) generated by the scanner 221. A network interface 218 connects the controller 210 to the Internet 105.

Figure 3:
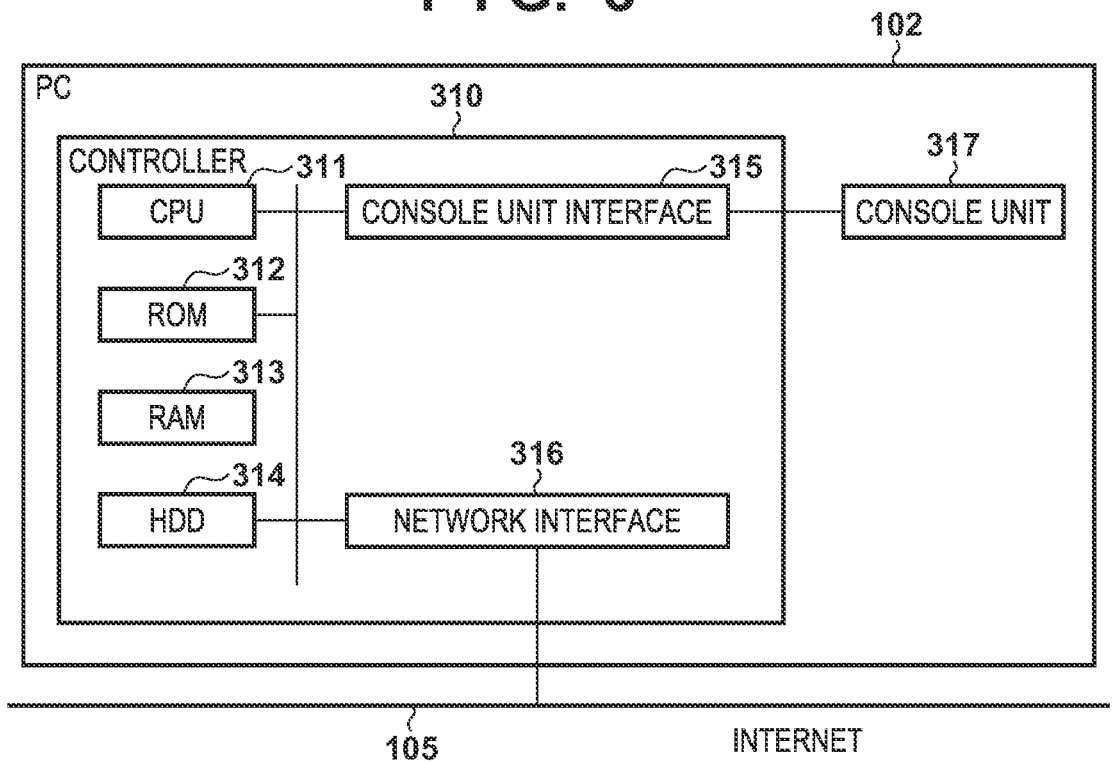
FIG. 3 is a block diagram for describing a hardware configuration of a PC according to the embodiment.

FIG. 3 is a block diagram for describing a hardware configuration of the PC 102 according to the embodiment.

A controller 310 including a CPU 311 controls the entire operation of the PC 102. The CPU 311 executes a boot program stored in the ROM 312, deploys an OS and a program stored in an HDD 314 in a RAM 313, and executes various control processes by executing the deployed program. The RAM 313 is used as a temporary storage area such as a work area and a main memory of the CPU 311. The HDD 314 stores image data and various programs. A console unit interface 315 connects a console unit 317 and the controller 310. The console unit 317 includes a display unit, a keyboard, and the like. A network interface 316 connects the controller 310 to the Internet 105.

Figure 4:
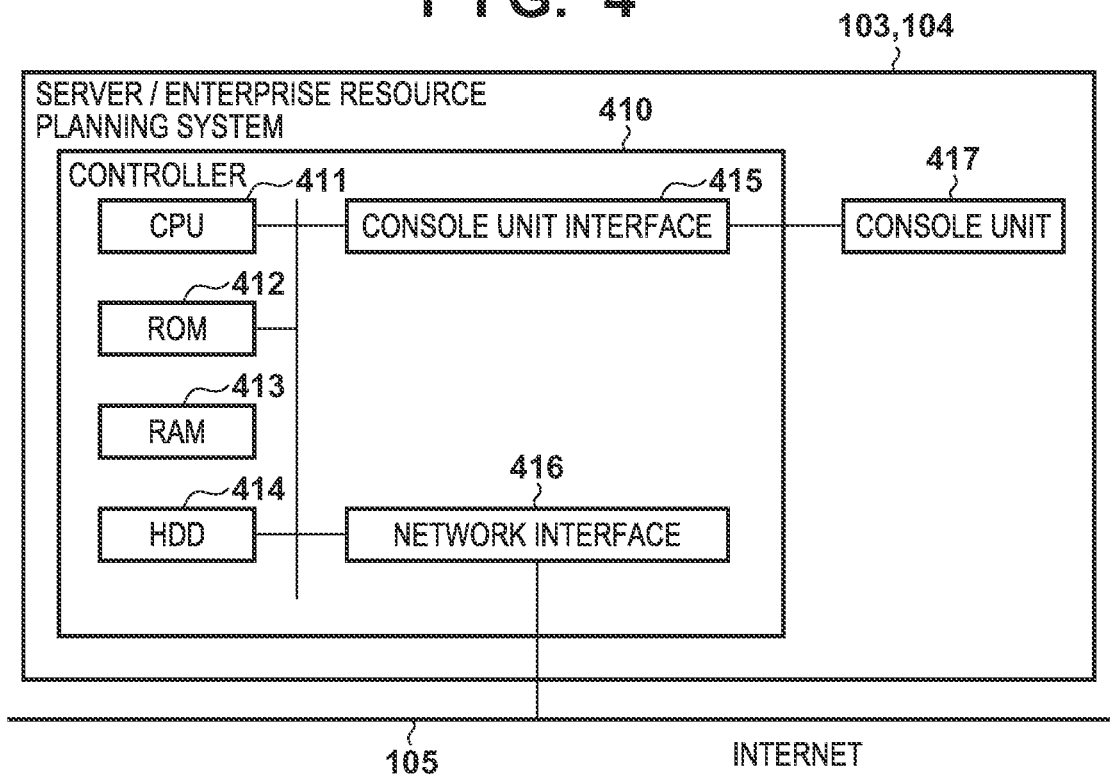
FIG. 4 is a block diagram for describing a hardware configuration of a server/an enterprise resource planning system according to the embodiment.

FIG. 4 is a block diagram for describing a hardware configuration of the server 103/the enterprise resource planning system 104 according to the embodiment. Here, the server 103 and the enterprise resource planning system 104 have the same hardware configuration.

A controller 410 that includes a CPU 411 controls the entire operation. The CPU 411 executes a boot program stored in a ROM 412, deploys an OS and a program stored in an HDD 414 in a RAM 413 and executes various control processes by executing the deployed program. The RAM 413 is used as a temporary storage area such as a work area and a main memory of the CPU 411. The HDD 414 stores image data and various programs. A console unit interface 415 connects a console unit 417 and the controller 410. The console unit 417 includes a display unit, a keyboard, and the like. A network interface 416 connects the controller 410 to the Internet 105.

Figure 5:
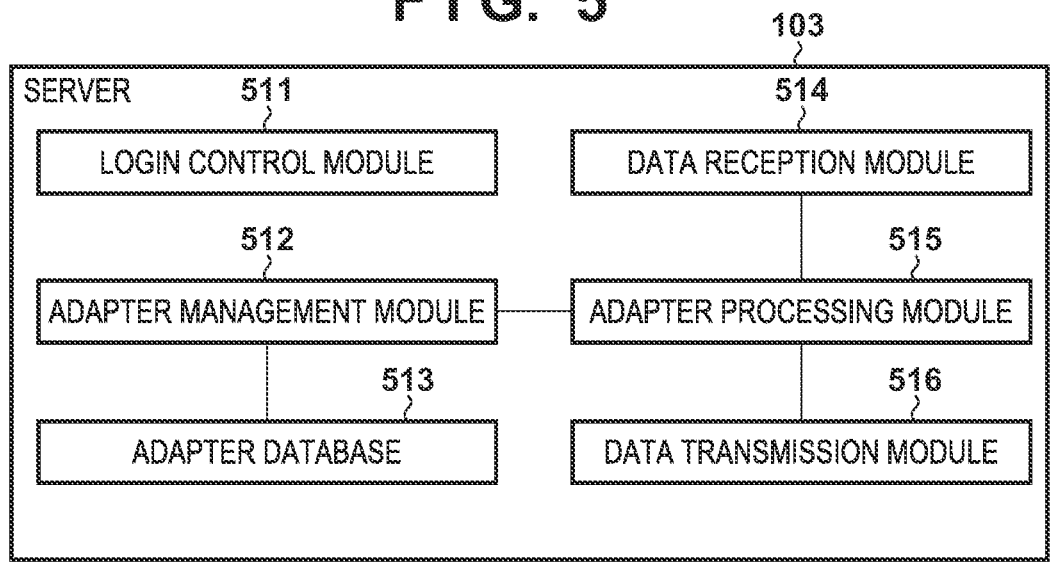
FIG. 5 is a block diagram for describing an example of a configuration of a software module of the server according to the embodiment.

FIG. 5 is a block diagram for describing an example of a configuration of a software module of the server 103 according to the embodiment. Note that a function of each part illustrated in FIG. 5 is implemented by the CPU 411 executing a program deployed in the RAM 413.

A login control module 511 performs a login process of the image forming apparatus 101 that accesses the server 103. An adapter management module 512 registers an adapter in the server 103 and provides a list of registered adapters. Details of the adapter is described later with reference to FIG. 6. An adapter database 513 is a database that stores data of registered adapters. The data reception module 514 performs a process of receiving data from the image forming apparatus 101. An adapter processing module 515 performs an adapter process on the basis of data received by the data reception module 514. A data transmission module 516 performs a process of transmitting a result of the process performed by the adapter processing module 515 to the image forming apparatus 101.

Next, a flow of an operation of the entire information system according to the embodiment is described. The embodiment is divided into a process of registering an adapter in the server 103 and a process of scanning an original document to register data in the enterprise resource planning system 104.

First, an adapter is described with reference to FIG. 6.

Figure 6:
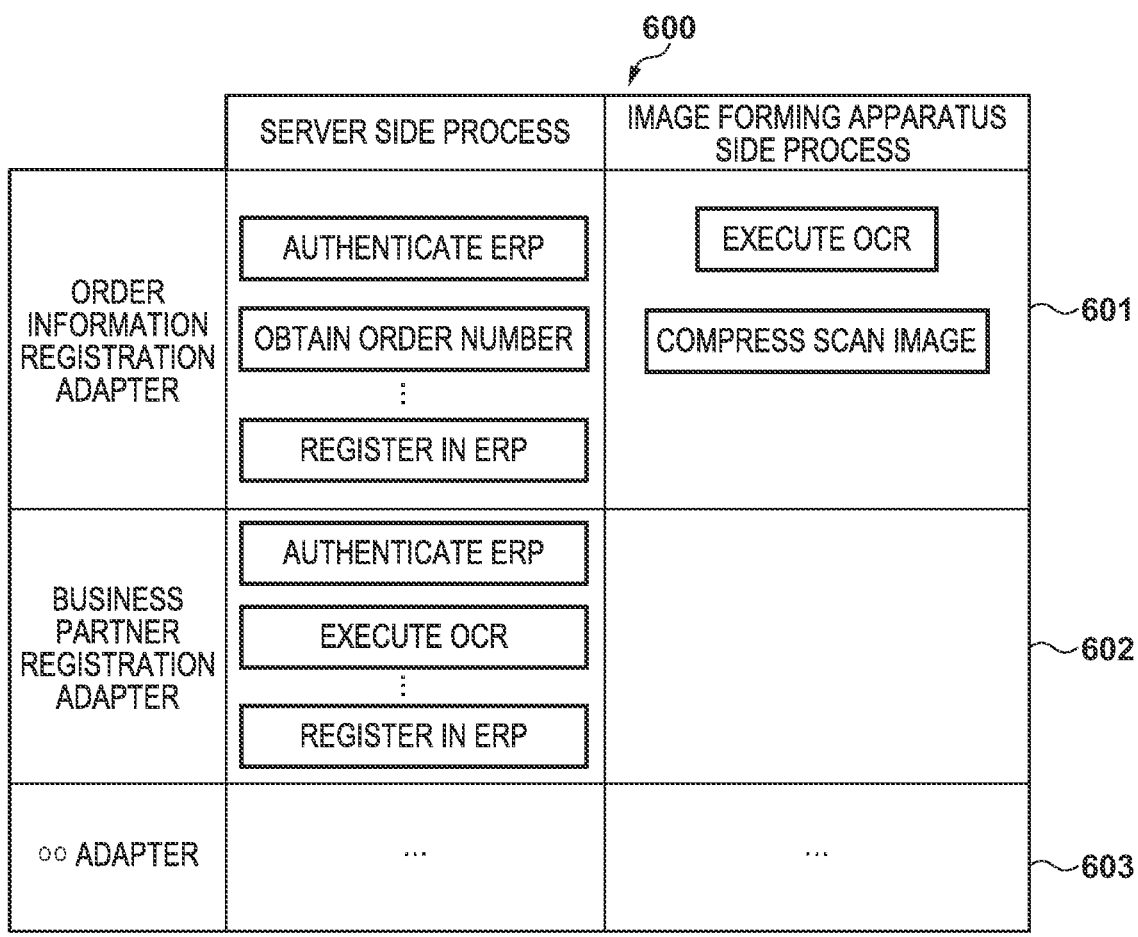
FIG. 6 is a diagram for describing an example of an adapter that describes a process that is customizable by a user.

FIG. 6 is a diagram illustrating an example of an adapter 600 that describes a process that is customizable by a user. The adapters are registered in the server 103.

Adapters 601 to 603 describe a series of processes in which data scanned and obtained by the image forming apparatus 101 is converted into data to be registered in the enterprise resource planning system 104, and the data is registered in the enterprise resource planning system 104. The adapter describes and registers a process to be executed by the server 103 and a process to be executed by the image forming apparatus 101. In addition, a plurality of adapters can be registered here, and each adapter is stored in association with a user who logs in to the server 103. Thus, the user can select the desired adapter, and, in accordance with the selected adapter, the server 103 and the image forming apparatus 101 can perform processes of registration in the enterprise resource planning system 104.

In FIG. 6, for example, an adapter 601 describes that the image forming apparatus 101 scans and reads a document, for example, an estimation sheet, performs an OCR (character recognition) process on that image data, and compresses and stores that image data. Here, it describes that the server 103 executes authentication of the user who logs in to the enterprise resource planning system 104, acquisition of the order number on the basis of the results of the above-mentioned OCR process, and registration in the enterprise resource planning system 104. The adapter 602 describes that the server 103 executes authentication of the user who logs in to the enterprise resource planning system 104, the OCR process (character recognition process) on the image data obtained from the image forming apparatus 101, and registration based on the result of the OCR process in the enterprise resource planning system 104.

The processes registered in the adapters are described in a script language, for example. Detailed examples of the process of the adapters are described later with reference to FIGS. 14 and 15.

A process flow of a registration process with an adapter is described with reference to FIGS. 7 and 9.

Figure 7:
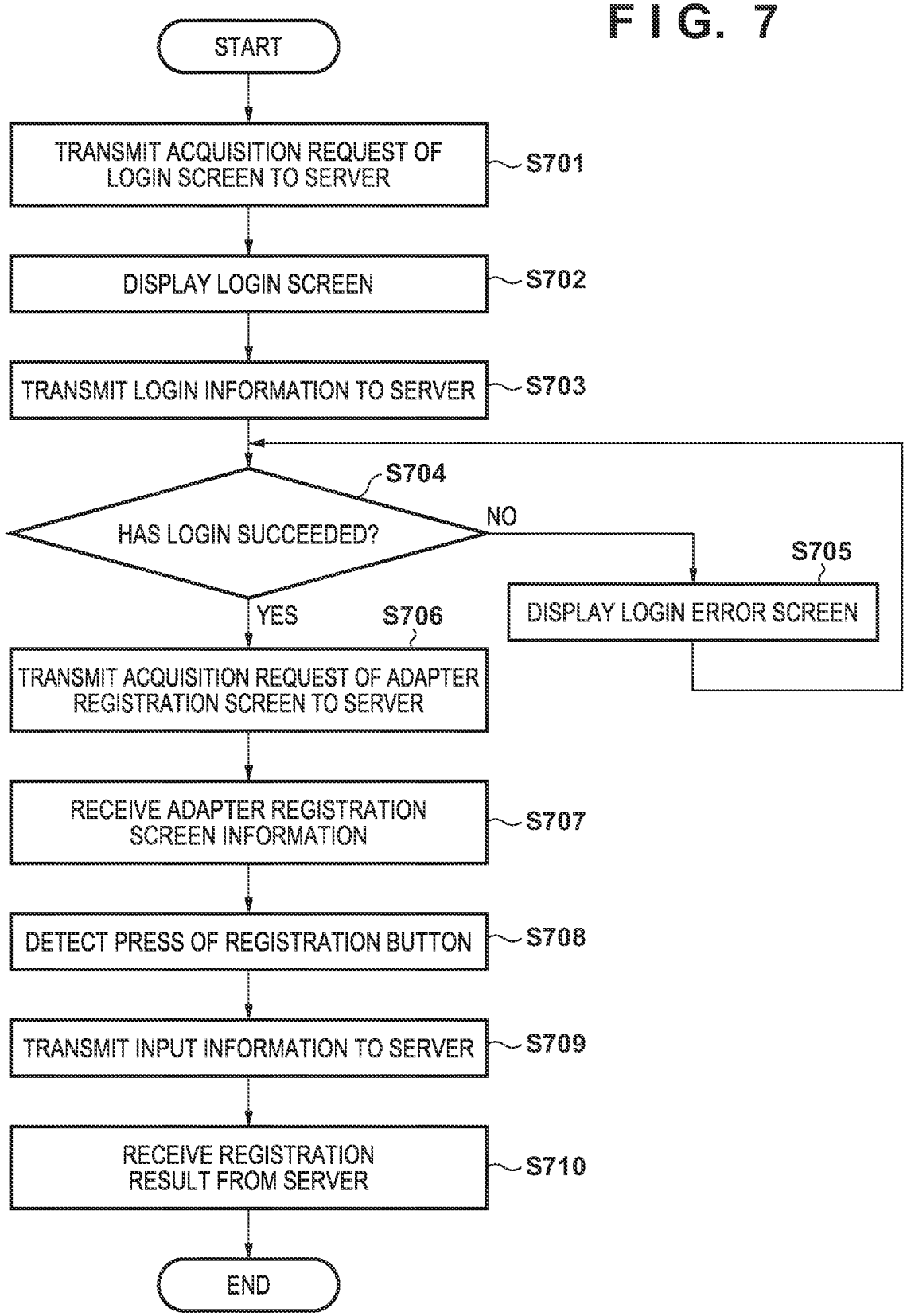
FIG. 7 is a flowchart for describing processes executed by a PC according to the embodiment.

FIG. 7 is a flowchart for describing processes executed by the PC 102 according to the embodiment. The processes illustrated in this flowchart are achieved when the CPU 311 of the PC 102 deploys a program stored in the HDD 314 in the RAM 313 and executes the program. Note that the screen information received by the PC 102 from the server 103 is described in HTML and is displayed in the Web browser of the PC 102.

At the start, the CPU 311 transmits an acquisition request of a login screen to the server 103 in step S701. Then, when receiving the login screen information transmitted from the server 103 in response to the acquisition request, the CPU 311 displays a login screen on the display unit of the console unit 317 in step S702. Next, the process proceeds to step S703, and the CPU 311 transmits login information (username, password) input via the login screen to the server 103. Then, when receiving the login result from the server 103, the process proceeds to step S704, and the CPU 311 determines whether or not the login has succeeded. When it is determined here that the login has failed, the process proceeds to step S705, and the CPU 311 displays the login error screen received from the server 103. Then, the process returns to step S703 to continue the process.

In accordance with a determination that the login has succeeded in step S704, the process proceeds to step S706, and the CPU 311 transmits a request of obtaining screen information of an adapter registration screen to the server 103. Then, the process proceeds to step S707, and when receiving the screen information of the adapter registration screen transmitted from the server 103 in response to the acquisition request, the CPU 311 displays the adapter registration screen on the display unit of the console unit 317. Via this adapter registration screen, the user of the PC 102 performs an adapter registration process by inputting the adapter name and the processing content of the adapter.

Figure 8:
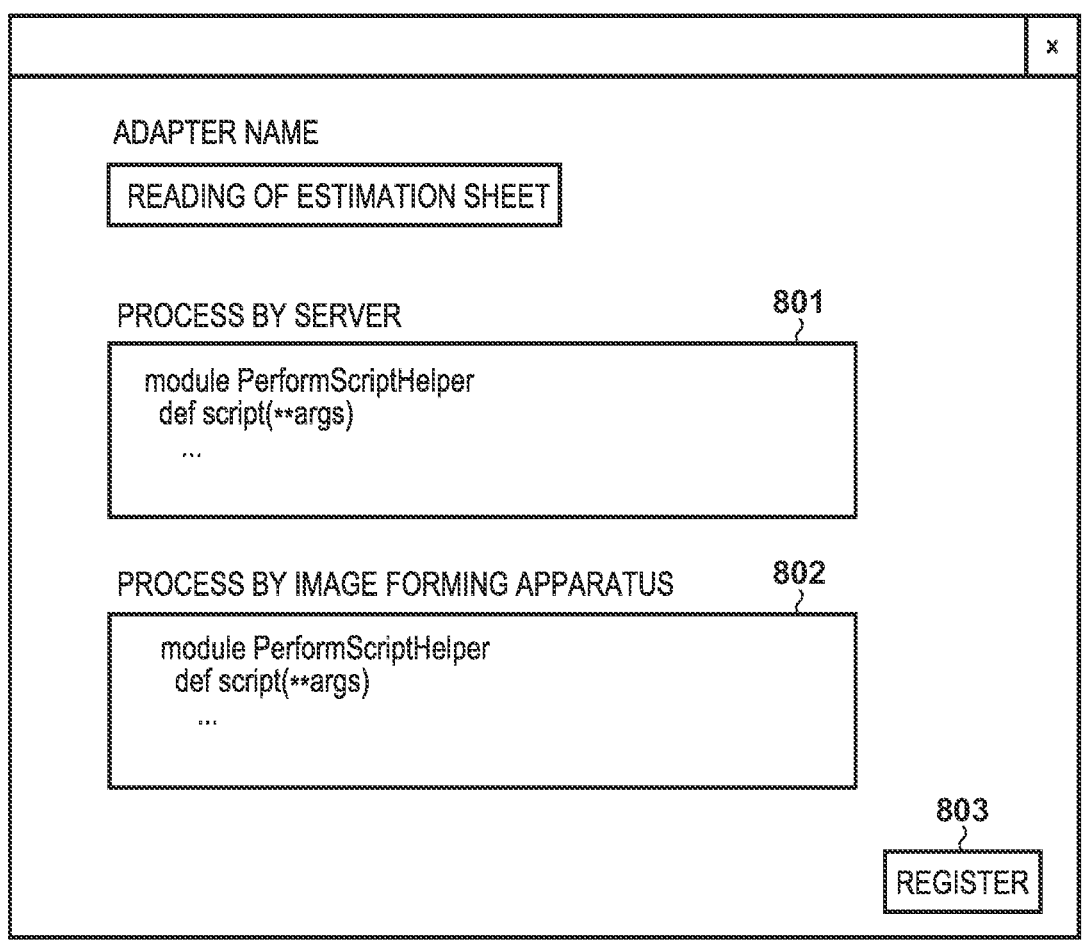
FIG. 8 is a diagram illustrating an example of an adapter registration screen displayed on the PC and an input example thereof according to the embodiment.

FIG. 8 is a diagram illustrating an example of an adapter registration screen displayed by the PC 102 and an input example thereof according to the embodiment.

In the example of FIG. 8, "reading of estimation sheet" is input as the name of the adapter. The process performed by the server 103 and the process performed by the image forming apparatus 101 are indicated by 801 and 802, respectively. A registration button 803 is a button for giving an instruction for registering the displayed content as an adapter named "reading of estimation sheet". Note that this adapter "reading of estimation sheet" corresponds to the adapter 601 of FIG. 6, for example. Specifically, first, the image forming apparatus 101 scans and reads the estimation sheet illustrated in FIG. 10A, for example, and executes an OCR process on the image data to obtain estimation data from information on the character string included in the estimation sheet. Then, the result of the process is transmitted to the server 103. In accordance with the adapter 601, the server 103 executes an authentication process of the user for login of the user to the enterprise resource planning system 104, and executes a process for creating order data from estimation data on the basis of the result of the process from the image forming apparatus 101. Finally, the order number is obtained to create the order data, and the created order data is registered in the enterprise resource planning system 104. The above-mentioned series of processes is registered as an adapter, and thus the registered adapter can be executed by simply selecting it.

Returning to FIG. 7 again, when the CPU 311 detects a press of the registration button 803 of the adapter registration screen in step S708, the process proceeds to step S709, and the CPU 311 transmits the information input on the adapter registration screen to the server 103. Then, the process proceeds to step S710, and when the CPU 311 receives the registration result of the adapter from the server 103, the CPU 311 displays something to that effect on the display unit, and terminates the process.

As described above, according to the processes of FIG. 7, the user logged in to the enterprise resource planning system 104 from the PC 102 can receive the adapter registration screen from the server 103, and can register the procedure of performing the desired process in the server 103 as an adapter from the registration screen.

Figure 9:
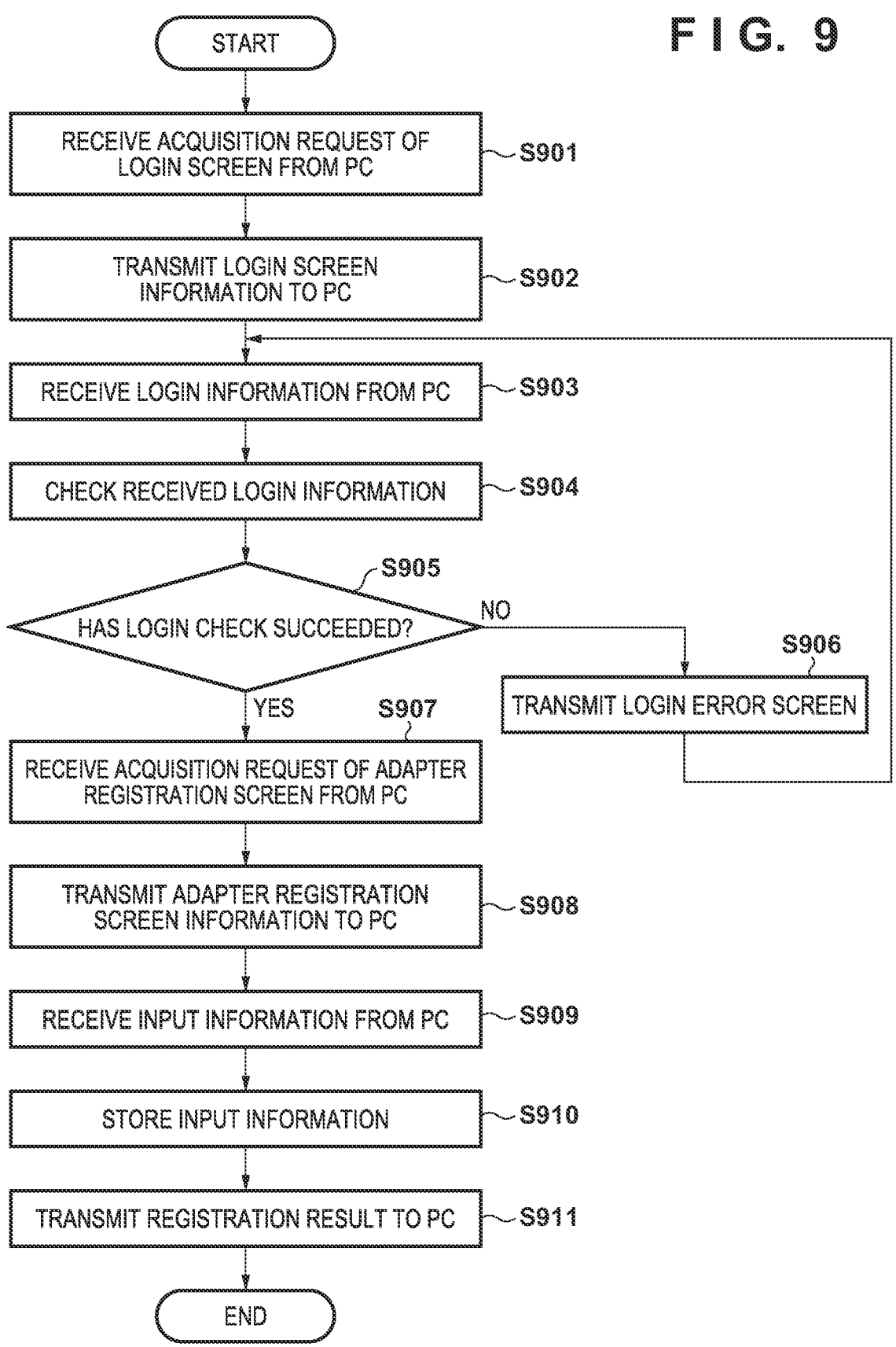
FIG. 9 is a flowchart for describing processes executed by the server according to the embodiment.

FIG. 9 is a flowchart for describing processes executed by the server 103 according to the embodiment. The processes illustrated in this flowchart are achieved when the CPU 411 of the server 103 deploys a program stored in HDD 414 in the RAM 413 and executes the program.

First, in S901, the CPU 411 receives the acquisition request of the login screen transmitted from the PC 102 in step S701 of FIG. 7. Next, in step S902, the CPU 411 transmits screen information of the requested login screen to the PC 102 that has requested it. Next, the process proceeds to step S903, and the CPU 411 receives the login information transmitted from the PC 102 in step S703 of FIG. 7. This login information includes a username and a password, for example. Next, the process proceeds to step S904, and the CPU 411 determines whether or not the received login information is correct. Then, in step S905, the CPU 411 determines whether the login has succeeded or failed. At this point, in accordance with a determination that the login has failed, the process proceeds to step S906 and the CPU 411 transmits a login error screen to the PC 102. Then, the process proceeds to step S903 to continue the process.

In accordance with a determination of the CPU 411 that the login has succeeded in step S905, the process proceeds to step S907, and the CPU 411 receives the acquisition request of the adapter registration screen transmitted from the PC 102 in step S706 in FIG. 7. Then, the process proceeds to step S908, and the CPU 411 transmits the screen information of the adapter registration screen to the PC 102. Next, the process proceeds to step S909, and the CPU 411 receives the information input via the adapter registration screen transmitted from the PC 102 in step S709 of FIG. 7. Then, the process proceeds to step S910, and the CPU 411 stores the information received in step S909, and the CPU 411 transmits the registration result of the adapter to the PC 102 in step S911, and then, terminates the process.

As described above, according to the processes illustrated in FIG. 9, the user logged in to the enterprise resource planning system 104 from the PC 102 can register the procedure of performing the desired process registered in the adapter registration screen as an adapter.

Next, a flow of processes of using an adapter to register data in the enterprise resource planning system 104 from image data obtained by scanning a document with the image forming apparatus is described.

In the example, the document to be scanned is "estimation sheet". When the print button is pressed on this screen where the estimation data can be registered and managed, the enterprise resource planning system 104 can print an estimation sheet from the registered estimation data. Likewise, order data can also be registered and managed. The embodiment describes a series of processes of creating order data with an example of estimation data as an example of business transactions using the enterprise resource planning system 104.

FIG. 10A is a diagram illustrating an example of estimation data input to the enterprise resource planning system 104 according to the embodiment.

An estimation number (here "ABC0001") generated by the enterprise resource planning system 104 is assigned to the estimation data. The user can print an estimation sheet from the estimation data and can send the estimation sheet to a business partner. The business partner who has received the estimation sheet puts a necessary item and a stamp on the estimation sheet, and sends it to the user. In the embodiment, the delivery address is input as the necessary item. By scanning the estimation sheet with the image forming apparatus 101 and performing a process based on the image data obtained by the scanning, order data can be created from the estimation data registered in the enterprise resource planning system 104.

FIG. 10B is a diagram illustrating an example of estimation data whose trade state has proceeded from an estimation state to an order state in the enterprise resource planning system 104 according to the embodiment. Here, the state of the estimation data is "close" and an order number (here, "DEF0001") is issued.

Figure 11:
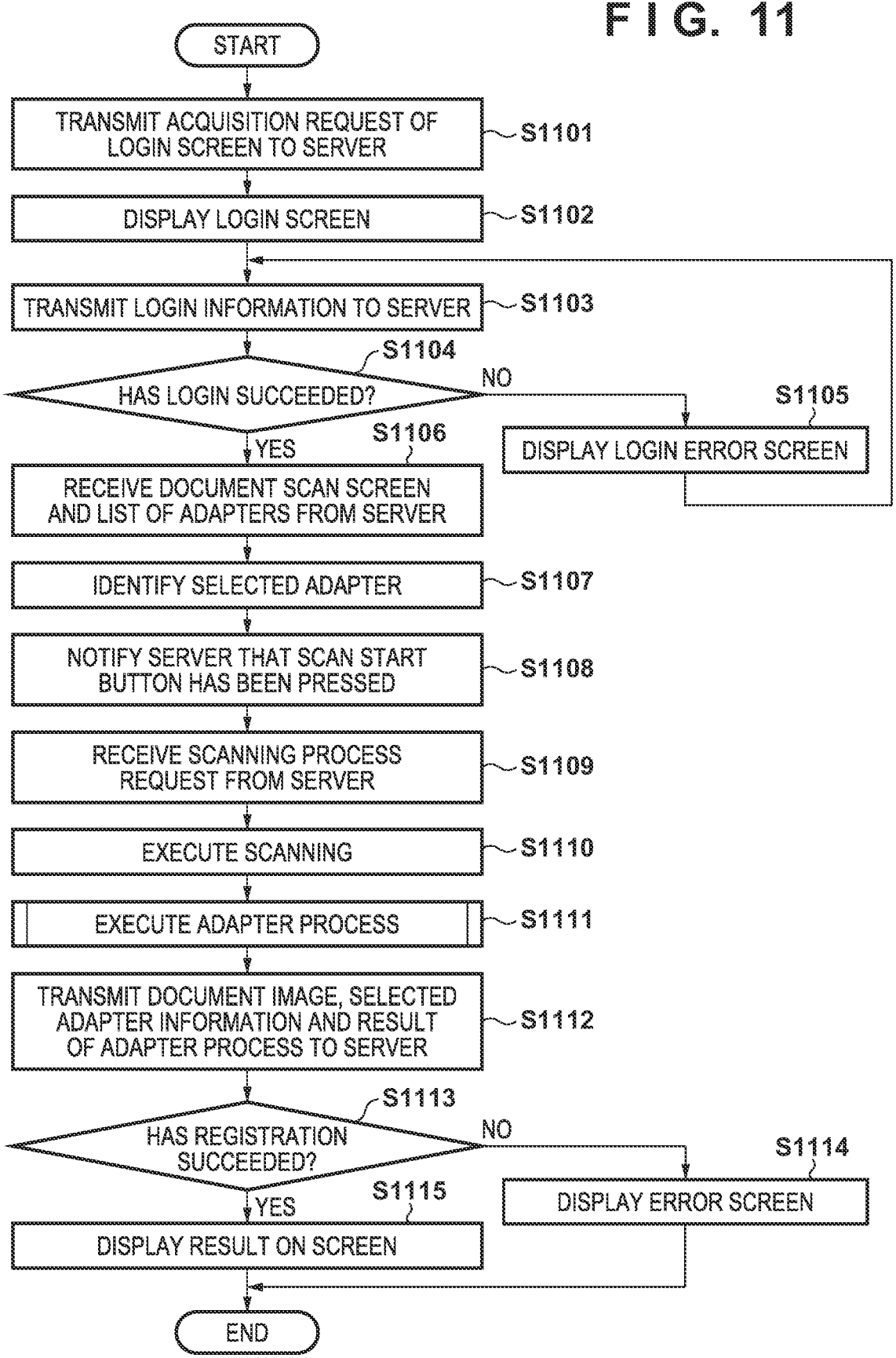
FIG. 11 is a flowchart for describing processes executed by the image forming apparatus according to the embodiment.

FIG. 11 is a flowchart for describing processes executed by the image forming apparatus 101 according to the embodiment. The processes illustrated in this flowchart are achieved when the CPU 211 deploys a program stored in the HDD 214 in the RAM 213 and executes the program. Screen information received from the server 103 is displayed in the Web browser of the image forming apparatus 101.

When the process is started, first, the CPU 211 transmits an acquisition request of a login screen to the server 103 in step S1101. Then, when receiving login screen information transmitted from the server 103 in response to the acquisition request, the CPU 211 displays a login screen on the display unit of the console unit 219 in step S1102. Next, the process proceeds to step S1103, and the CPU 211 transmits the login information input via the login screen to the server 103. Then, when receiving the login result from the server 103, the process proceeds to step S1104, and the CPU 211 determines whether or not the login has succeeded. When the login has failed, the process proceeds to step S1105, and the CPU 211 displays a login error screen received from the server 103. Then, the process returns to step S1103 to continue the process.

When the login has succeeded in step S1104, the process proceeds to step S1106, and the CPU 211 receives, from the server 103, screen information of a document scan screen associated with the logged-in user, and a list of adapters. The list of adapters is displayed on the document scan screen, and the user can select the desired adapter. In addition, at this time, the content of description (processing content) registered in each adapter is also transmitted as the list of the adapter from the server 103 to the image forming apparatus 101.

Figure 13:
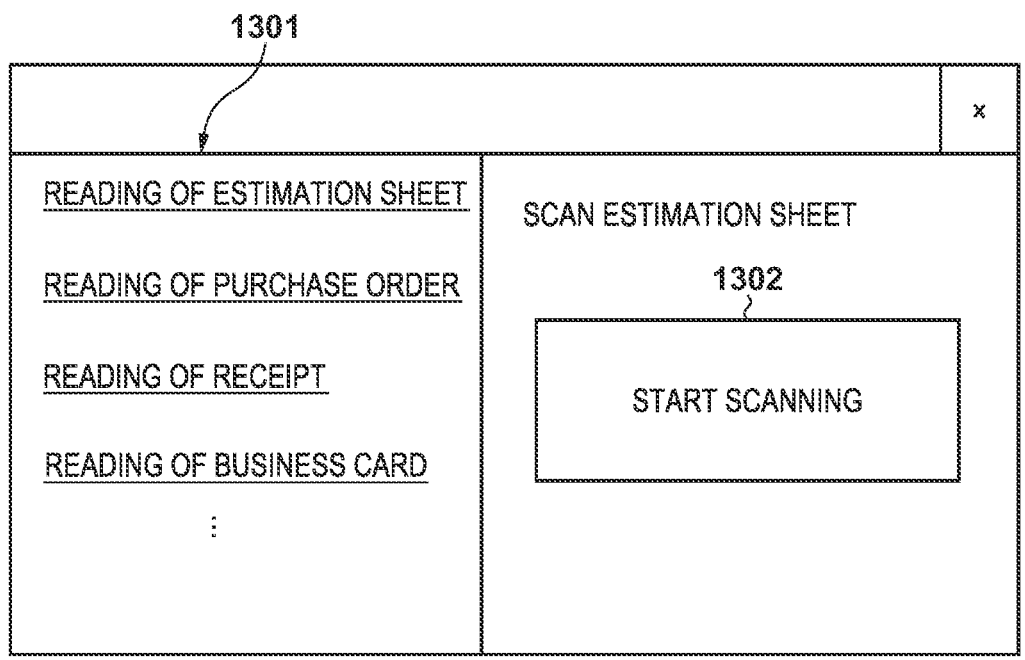
FIG. 13 is a diagram illustrating an example of a list of adapters and a document scan screen displayed by the image forming apparatus according to the embodiment.

FIG. 13 is a diagram illustrating an example of a list of adapters and a document scan screen displayed in the image forming apparatus 101 according to the embodiment.

In the example of FIG. 13, a list of adapters 1301 and a scan start button 1302 for instruction of the start of a scan of a document are displayed.

Next, the process proceeds to step S1107, and the CPU 211 identifies the adapter selected by the user in the screen of FIG. 13. Then the process proceeds to step S1108, and, when detecting a press of the scan start button 1302 by the user, the CPU 211 notifies the server 103 that the scan start button 1302 has been pressed. Then, the process proceeds to step S1109, and, when the CPU 211 receives a scanning process request from server 103 in response to the notification, the process proceeds to step S1110, and the CPU 211 controls a scanner 221 to perform a scanning process.

After performing the scanning process in the above-mentioned manner, the process proceeds to step S1111, and the CPU 211 executes a process of the image forming apparatus 101 described in the selected adapter. Examples of the process of the adapter will be described later with reference to the flowchart of FIG. 14. Then, the process proceeds to step S1112, and the CPU 211 transmits the document image obtained by the scanning, the selected adapter information, and the result of the adapter process to the server 103. Then, the process proceeds to step S1113, and the CPU 211 receives the result of the registration process from the server 103 and determines whether or not the registration has succeeded. When the registration has failed, the process proceeds to step S1114, and the CPU 211 displays an error screen and terminates the process. This error screen includes error information included in the received information. When the registration has succeeded, the process proceeds to step S1115, and the CPU 211 displays the result on the screen and terminates the process.

As described above, according to this process, the user of the image forming apparatus 101 can select the desired adapter from the registered adapters associated with the user so as to execute the process defined by the selected adapter, and can register the result of the process in the server 103.

Figure 12:
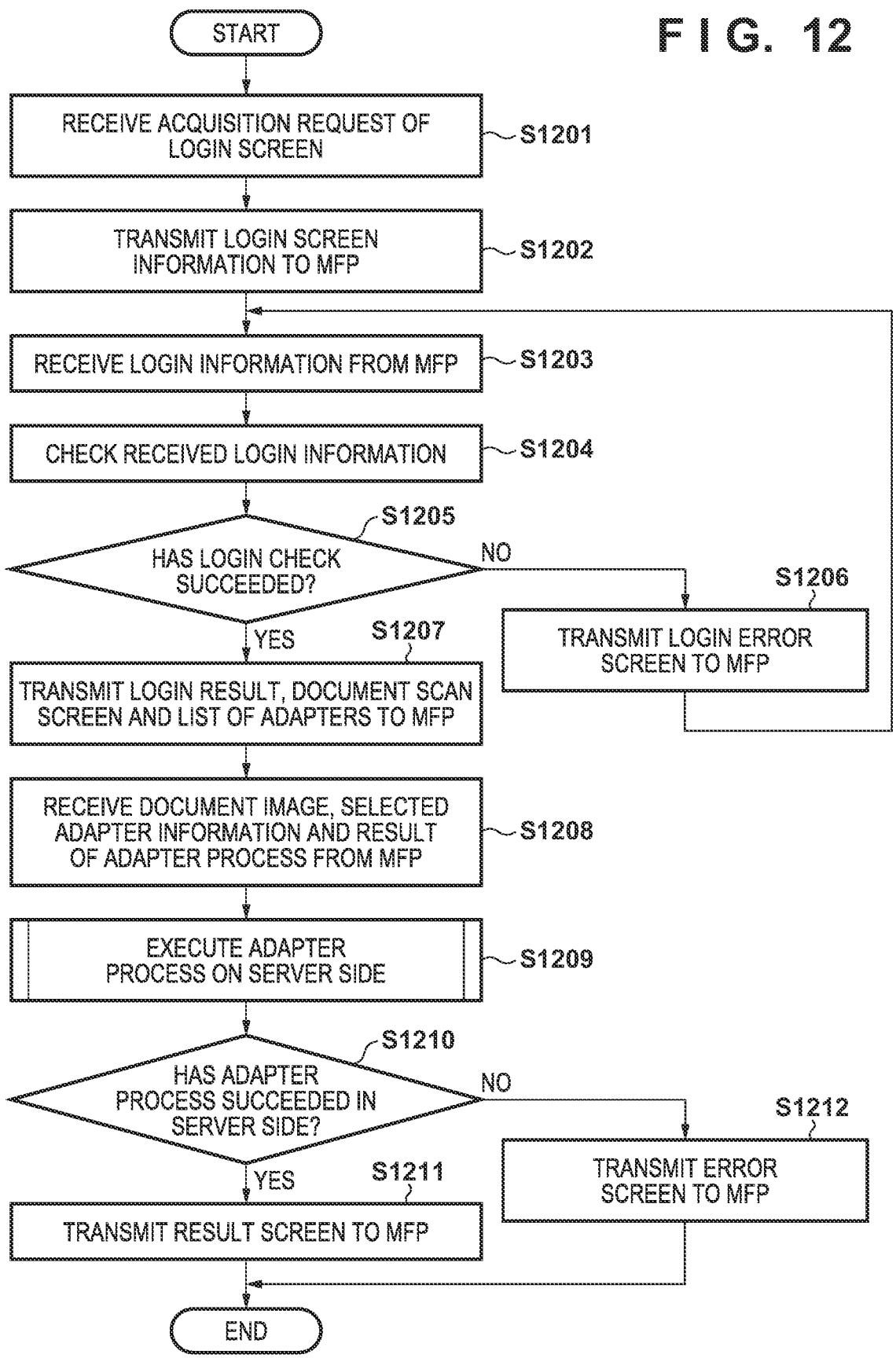
FIG. 12 is a flowchart for describing processes executed by the server according to the embodiment.

FIG. 12 is a flowchart for describing processes executed by the server 103 according to the embodiment. The processes illustrated in this flowchart are achieved when the CPU 411 of the server 103 deploys a program stored in the HDD 414 in the RAM 413 and executes the program.

First, in step S1201, the CPU 411 receives the acquisition request of the login screen transmitted from the image forming apparatus 101 in step S1101 in FIG. 11. Then, the process proceeds to step S1202, and the CPU 411 transmits the login screen to the image forming apparatus 101. Then, the process proceeds to step S1203, and the CPU 411 receives the login information transmitted from the image forming apparatus 101 in step S1103 in FIG. 11. This login information includes a username and a password, for example. Then, in step S1204, the CPU 411 checks whether or not the received login information is correct, and the CPU 411 determines whether the login has succeeded or failed in step S1205. Then, in accordance with a determination that the login has failed, the process proceeds to step S1206, and the CPU 411 transmits a login error screen to the image forming apparatus 101. Then, the process returns to step S1203 to continue the process.

In accordance with a determination that the login was successful, the process proceeds to step S1207, and the CPU 411 transmits, to the image forming apparatus 101, a login result, a document scan screen, and a list of adapters corresponding to (associated with) the logged-in user registered in the server 103. An example of the document scan screen and the list of adapters are as illustrated in FIG. 13 described above.

Then, the process proceeds to step S1208, and the CPU 411 receives the document image data transmitted from the image forming apparatus 101 in step S1112 in FIG. 11, the selected adapter information, and the result of the adapter process executed by the image forming apparatus 101. Then, the process proceeds to step S1209, and the CPU 411 executes an adapter process in the server 103 on the basis of the information received in step S1208. Details of the adapter process in the server 103 will be described later with reference to the flowchart of FIG. 15. Then, the process proceeds to step S1210, and the CPU 411 determines whether or not the adapter process at the server 103 has succeeded. In accordance with a determination that the process has failed, the process proceeds to step S1212, and the CPU 411 transmits an error screen to the image forming apparatus 101 and terminates the process. In accordance with a determination that the process has succeeded, the process proceeds to step S1211, and the CPU 411 transmits a result screen to the image forming apparatus 101 and terminates the process.

As described above, according to this process, when authentication of the user logged in to the image forming apparatus 101 has succeeded, the server 103 transmits a list of the adapters associated with the user to the image forming apparatus 101. Then, the result of the process in accordance with the adapter selected by the image forming apparatus 101 is received, and the process of the server 103 defined by the adapter is executed, and, the result can be displayed by the image forming apparatus 101.

Figure 14:
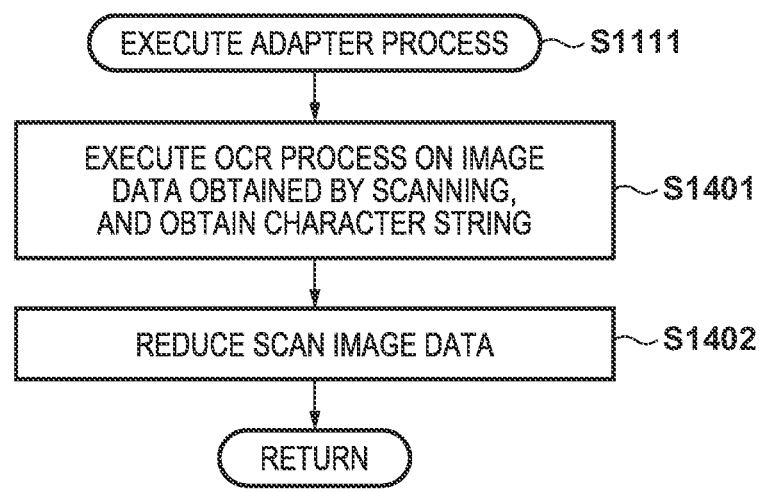
FIG. 14 is a flowchart for describing an example of a flow of an adapter process at step S1111 of FIG. 11, which is executed by the image forming apparatus according to the embodiment.

FIG. 14 is a flowchart for describing an example of the flow of the adapter process of the step S1111 in FIG. 11 that is executed by the image forming apparatus 101 according to the embodiment. Here, the description is made with an example of the adapter 601 illustrated in FIG. 6.

In step S1401, the CPU 211 of the image forming apparatus 101 performs an OCR process on the image data obtained by the scanning, and extracts the character string contained in the image data. Note that, to accurately recognize the characters by the OCR process, it is desirable to perform the OCR process on high-resolution image data. As such, to perform the OCR with high accuracy on the server 103, high-resolution image data must be transmitted from the image forming apparatus 101 to the server 103 via the Internet 105. In contrast, in the example, a character string is obtained using the OCR function provided in the image forming apparatus 101, and it is therefore not necessary to send high-resolution image data to the server 103. Accordingly, in step S1402, the CPU 211 reduces the image data obtained by the scanning. Thus, the communication amount of the communication line can be advantageously reduced.

On the other hand, typically, the performances of the CPU and the GPU of the image forming apparatus 101 are lower than those of the server 103, and as such the OCR process disadvantageously takes more time. In view of this, to perform the OCR process at high speeds, it is also possible to register an adapter process of performing the OCR process by the server 103 without performing the OCR process by the image forming apparatus 101 as in the adapter 602 illustrated in FIG. 6.

FIG. 15 is a flowchart for describing the flow of the adapter process of the step S1209 in FIG. 12 executed by the server 103 according to the embodiment. Here, a case where an adapter indicating "reading of estimation sheet" illustrated in FIGS. 8 and 13 is selected is described.

In step S1501, the CPU 411 of the server 103 transmits an authentication request to the enterprise resource planning system 104. At this time, the transmission destination of the authentication request may be an external authentication server that cooperates with the enterprise resource planning system 104, rather than the enterprise resource planning system 104 itself. Next, the process proceeds to step S1502, and the CPU 411 receives an access token from the enterprise resource planning system 104. The access token is data indicating a success of the authentication, and in the subsequent processes, the access token is given to transmission when a request is transmitted to the enterprise resource planning system 104. Next, the process proceeds to step S1503, and the CPU 411 extracts the estimation number from the character string included in the result of the adapter process received in step S1208 in FIG. 12. Then, in step S1504, the CPU 411 determines whether or not the extraction of the estimation number has succeeded. In accordance with a determination that the extraction has failed, the process proceeds to step S1505, and the CPU 411 stores the result as an error and terminates the process.

When the extraction of the estimation number has succeeded, the process proceeds to step S1506, and the CPU 411 transmits, to the enterprise resource planning system 104, an acquisition request for the estimation data matching the extracted estimation number. Then, in step S1507, the CPU 411 determines whether or not the designated estimation data exists from the results of the acquisition request. In accordance with a determination that the designated estimation data does not exist, the process proceeds to step S1505, and the result is stored as an error and the process is terminated.

In accordance with a determination that there is the estimation data, the process proceeds to step S1508, and the CPU 411 requests the enterprise resource planning system 104 to generate order data on the basis of the obtained estimation data. This causes the enterprise resource planning system 104 to generate order data by copying the contents of the estimation data, and to transmit it to the server 103. Then, in step S1509, the CPU 411 receives the generated order data from the enterprise resource planning system 104. Thus, the process proceeds to step S1510, and the CPU 411 performs a closing process of the estimation sheet since the state has proceeded to an order state and the original estimation data is no longer unnecessary (see FIG. 10B). At this time, the CPU 411 transmits, to the enterprise resource planning system 104, a request for closing the state of the estimate data of the designated estimate number.

Next, the process proceeds to step S1511, and the CPU 411 extracts the delivery address from the character string included in the result of the adapter process received from the image forming apparatus 101 in step S1208 in FIG. 12. Then, the process proceeds to step S1512, and the CPU 411 requests the enterprise resource planning system 104 to update the delivery address of the generated order data with the delivery address extracted in step S1511. Then, the process proceeds to step S1513, and the CPU 411 saves the results of the previous processes and terminates the process.

As described above, according to the embodiment, the adapter that describes the procedure of the user's processes is registered in the server 103 in association with the user. The user can select the desired adapter from the registered adapters to cause the device or system connected with the server 103 to execute processes corresponding to the selected adapter.

Other Embodiments

Embodiments of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-144022, filed Jul. 31, 2018, which is hereby incorporated by reference herein in its entirety.

What is claimed is:

1. An information processing system in which at least a server and an information processing apparatus and an image forming apparatus are connected via a network,
wherein the information processing apparatus comprises:
a first memory device that stores a program; and at least one first processor that executes the program stored in the first memory device to cause the information processing apparatus to function as:
  a first requesting unit that requests authentication of a user to the server; and
  a first registration unit that registers, in the server, an adapter that describes a workflow of a processes in response to an operation by the user successfully authenticated by the server;
wherein the image forming apparatus comprises:
a second memory device that stores a program; and
at least one second processor that executes the program stored in the second memory device to cause the image forming apparatus to function as:
  a second requesting unit that requests user authentication of a user to the server;
  an obtaining unit that obtains the adapter registered in the server and corresponding to the user authenticated via the user authentication by the server;
  a first execution unit that executes a first process to be executed by the image forming apparatus, the first process being described as a part of the workflow corresponding to the adapter obtained by the obtaining unit; and
  a transmission unit that transmits, to the server, a result of the first process executed by the first execution unit and the obtained adapter; and
wherein the server comprises:
a third memory device that stores a program; and
at least one third processor that executes the program stored in the third memory device to cause the server to function as:
  an authentication unit that authenticates the user in response to the request for the user authentication from the image forming apparatus or the request for the authentication from the information processing apparatus;
  a storage unit that stores the adapter registered by the first registration unit;
  a reception unit that receives the result of the first process based on the adapter obtained by the obtaining unit from the image forming apparatus;
  a second execution unit that, when a second process to be executed by the server is described as a part of the workflow corresponding to the obtained adapter from the image forming apparatus, executes the second process; and
  a second registration unit that registers the result of the first process and a result of the second process executed by the second execution unit.

2. The information processing system according to claim 1, wherein the first registration unit receives screen information of an adapter registration screen from the server to display the adapter registration screen, and transmits information input via the adapter registration screen to the server to register the adapter.

3. The information processing system according to claim 1, wherein the first registration unit is capable of registering each of the first process to be executed by the image forming apparatus and the second process to be executed by the server.

4. The information processing system according to claim 1, wherein the obtaining unit obtains from the server a list of adapters stored in the storage unit corresponding to the user authenticated by the server to display the list, and obtains the adapter selected by the user from the list.

5. The information processing system according to claim 1,
  wherein the image forming apparatus includes a scanner that reads a document to generate image data; and
  wherein the first process to be executed by the image forming apparatus includes a reading process to be executed by the scanner.

6. The information processing system according to claim 5, wherein the second process to be executed by the server includes a process based on a result of a character recognition process i on the image data generated by the scanner of the image forming apparatus.

7. A method of controlling an information processing system in which at least a server and an information processing apparatus and an image forming apparatus are connected via a network, the method comprising:
  requesting, at the information processing apparatus, authentication of a user to the server;
  requesting, at the image forming apparatus, user authentication to the server;
  registering, at the information processing apparatus, an adapter that describes a workflow of processes in the server in response to an operation by the user successfully authenticated by the server;
  obtaining, at the image forming apparatus, the adapter registered in the server corresponding to the user authenticated via the user authentication by the server;
  executing, at the image forming apparatus, a first process to be executed by the image forming apparatus, the first process being described as a part of the workflow corresponding to the adapter obtained in the obtaining;
  transmitting, at the image forming apparatus, a result of the first process in the executing and the obtained adapter to the server;
  authenticating, at the server, the user in response to the request for the user authentication from the image forming apparatus or the request for the authentication from the information processing apparatus;
  storing, at the server, the adapter registered in the registering;
  receiving, at the server, the result of the first process based on the obtained adapter from the image forming apparatus;
  executing, at the server, when a second process to be executed by the server is described as a part of the workflow corresponding to the obtained adapter from the image forming apparatus, the second process; and
  registering, at the server, the result of the first process transmitting and a result of the second process in the executing by the server.

* * * * *